(12) United States Patent
Fairgrieve et al.

(10) Patent No.: US 9,796,383 B2
(45) Date of Patent: Oct. 24, 2017

(54) METHOD OF SPEED CONTROL FOR A VEHICLE

(71) Applicant: Jaguar Land Rover Limited, Whitney Coventry, Warwickshire (GB)

(72) Inventors: Andrew Fairgrieve, Rugby (GB); James Kelly, Solihull (GB); Saleem Zuberi, Leamington Spa (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/379,993

(22) PCT Filed: Feb. 20, 2013

(86) PCT No.: PCT/EP2013/053385
§ 371 (c)(1),
(2) Date: Aug. 20, 2014

(87) PCT Pub. No.: WO2013/124321
PCT Pub. Date: Aug. 29, 2013

(65) Prior Publication Data
US 2016/0031444 A1    Feb. 4, 2016

(30) Foreign Application Priority Data
Feb. 20, 2012   (GB) .................................. 1202879.1

(51) Int. Cl.
*B60T 8/32*       (2006.01)
*B60W 30/14*    (2006.01)
(Continued)

(52) U.S. Cl.
CPC .......... *B60W 30/146* (2013.01); *B22D 21/005* (2013.01); *B22D 21/022* (2013.01); *B60W 40/04* (2013.01); *B60W 40/105* (2013.01)

(58) Field of Classification Search
CPC ........................... B60W 30/146; B22D 21/005
See application file for complete search history.

(56) References Cited

U.S. PATENT DOCUMENTS 6,253,123 B1    6/2001   Schramm et al.
8,682,575 B2 *  3/2014   Sakashita ............... G01C 21/20
                                                          340/995.27
(Continued)

FOREIGN PATENT DOCUMENTS

DE        10242112          4/2004
DE      102006022080      11/2007
(Continued)

OTHER PUBLICATIONS

International Search Report for application No. PCT/EP2013/053385, dated May 23, 2013, 5 pages.
(Continued)

*Primary Examiner* — Adam Alharbi
(74) *Attorney, Agent, or Firm* — Reising Ethington P.C.

(57) ABSTRACT

A vehicle is adapted to sense a condition of use in which a maximum speed control speed is reduced. The condition of use may be indicated by a sensor of the vehicle, or selected according to the kind of terrain across which the vehicle is travelling. Selection of terrain type may be manual or automatic, and may enable a selection of sensors appropriate to the terrain type. A vehicle driver may select a speed control speed lower than the permitted maximum.

17 Claims, 4 Drawing Sheets

(51) Int. Cl.
  *B60W 40/105* (2012.01)
  *B60W 40/04* (2006.01)
  *B22D 21/00* (2006.01)
  *B22D 21/02* (2006.01)

(56) References Cited

U.S. PATENT DOCUMENTS

| | | | |
|---|---|---|---|
| 2004/0249535 A1* | 12/2004 | Maass | G05D 1/0246 701/41 |
| 2005/0131614 A1 | 6/2005 | Isogai et al. | |
| 2007/0061059 A1 | 3/2007 | Inoue et al. | |
| 2010/0191436 A1* | 7/2010 | Hellmann | B60W 30/146 701/96 |
| 2011/0066342 A1 | 3/2011 | Ozaki | |

FOREIGN PATENT DOCUMENTS

| | | |
|---|---|---|
| EP | 1355209 | 10/2003 |
| GB | 2448385 | 10/2008 |
| JP | H01106200 A | 4/1989 |
| JP | 2002518251 A | 6/2002 |
| JP | 2002307974 A | 10/2002 |
| JP | 2005193886 A | 7/2005 |
| JP | 2006213294 A | 8/2006 |
| JP | 2009280098 | 12/2009 |

OTHER PUBLICATIONS

Great Britain Combined Search and Examination Report for application No. GB1202879.1, dated Jun. 13, 2012, 5 pages.
Written Opinion for application No. PCT/EP2013/053385, dated May 23, 2013, 5 pages.
Japanese Office action with English summary corresponding to JP application No. 2014-557084, dated Dec. 8, 2015, 6 pages.
Japanese Office Action and English Summary for JP Application No. 2014-557084, dated Nov. 15, 2016, 7 pages.

* cited by examiner

METHOD OF SPEED CONTROL FOR A VEHICLE

FIELD OF THE INVENTION

The present invention relates to vehicle cruise control whereby a vehicle may be commanded to maintain a selected speed regardless of gradient. Aspects of the invention provide a method, a control unit and a vehicle.

BACKGROUND

Cruise control is commonly provided for highway driving and is settable by the vehicle driver, typically by pressing a button when the vehicle is at the desired speed. Plus and minus buttons provide for incremental speed variation whilst the cruise control is set. Cruise control generally cannot be enabled at less than a predetermined speed, e.g. 30 kph, to avoid use in non-highway driving, such as in an urban environment.

Some vehicles are adapted for off-highway use, and it would be desirable to provide low-speed cruise control tor such vehicles so as to permit progress to be maintained over rough terrain. In off-highway conditions cruise control may permit a driver, particularly a novice driver, to concentrate upon activities such as steering.

Off-highway conditions vary considerably in practice, so that it would be desirable to allow cruise control to be applied in an adaptive manner best able to permit an appropriate maximum speed of travel.

It is against this background that the present invention has been conceived. Embodiments of the invention may provide an apparatus, a method or a vehicle which addresses the above problems. Other aims and advantages of the invention will become apparent from the following description, claims and drawings.

SUMMARY OF THE INVENTION

According to one aspect of the invention there is provided a method of speed control for a vehicle having a driver selectable off-highway condition, said method comprising:
  detecting an off-highway condition of the vehicle;
  automatically setting a maximum speed appropriate to the detected off-highway condition.

The off-highway condition may be detected in response to a manual selection of a vehicle driver, or in response to an automatic selection by a vehicle control system.

Such an arrangement automatically sets a maximum pre-determined off-highway speed for speed control, when speed control is enabled. Setting of a maximum speed does not require input from the driver, and is not apparent until or unless speed control is selected Speed control at less than the predetermined maximum speed is permitted, but is inhibited at higher than the predetermined maximum speed even if such higher speed is requested by the vehicle driver.

Speed control in off-highway or on-highway conditions may be implemented by means of a speed control system. In some embodiments a vehicle may have an on-highway cruise control system for implementing speed control in on-highway conditions and an off-highway speed control system, speed control in off-highway conditions being implemented by means of the off-highway speed control system.

The speed control system may be operable to allow a user to set a set-speed, being the speed the user wishes to travel at. The user, for example a vehicle driver, may increase or decrease the set-speed in a conventional manner using any suitable control device, for example by using incremental '+' and '−' buttons within the pre-determined maximum speed.

The predetermined maximum speed may be varied according to terrain type, and is selected either by driver selection of a terrain type or by automatic sensing of terrain type by the vehicle. Systems of selecting or automatically recognizing a terrain type form no part of the present invention, but typically allow surfaces such as rock, mud, sand and snow to be distinguished so as to better adapt the vehicle systems to the terrain upon which the vehicle is travelling.

The predetermined maximum speed may also be varied according to at least one other detected condition or parameter of the vehicle, either in conjunction with a selection of terrain type or as an alternative. In another embodiment, the pre-determined maximum speed may be varied according to at least one parameter or condition, the parameter or condition being detected dependent upon the selected off-highway condition.

In one embodiment surface or road roughness or vehicle excitation may restrict maximum speed control speed according to the level of roughness sensed by an indicator of e.g. suspension travel or on one or more accelerometers of the vehicle. The level of roughness may be defined as a function of the frequency and amplitude of vehicle suspension movement, or an equivalent measurement of movement of the vehicle body relative to unsprung components such as wheels or axles.

Measurement of vehicle body movement may include sensing of pitch, heave and roll by suitable accelerometers, and such measurements may be integrated in order to better indicate the roughness of the terrain across which the vehicle is travelling.

In some embodiments, the method may include setting a maximum allowable rate of increase of speed when speed control is active in off-highway conditions. The maximum allowable rate may be set in dependence on a value of coefficient of friction between a wheel of the vehicle and a surface over which the vehicle is driving. Alternatively or in addition the maximum allowable rate may be set in dependence on the detected off-highway condition. For example, the off-highway condition may be determined in dependence on a selected driving mode. For example in some embodiments the off-highway condition may be determined in dependence on whether the selected driving mode is a driving mode optimised for travel over grass, over mud, over sand or any other type of terrain. In an embodiment one mode may be optimised for travel over grass, gravel and snow.

Vehicles having selectable driving modes are described in U.S. Pat. No. 7,349,776, the content of which is hereby incorporated by reference. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the subsystems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller.

In another embodiment vehicle attitude may be sensed so as to determine surface gradient, in particular to progressively restrict maximum speed control speed as a function of increasing gradient. Sensing of downhill gradient may give a greater restriction than sensing of an uphill gradient, since in downhill travel the vehicle mass tends to accelerate the vehicle. Sensing of a crossing gradient may also restrict maximum speed control speed according to the severity of the gradient.

In an embodiment the method may include setting a maximum allowable rate of increase of speed when speed control is active in off-highway conditions, in dependence at least in part on surface gradient. In one embodiment, the maximum allowable rate of increase of speed when speed control is active in off-highway conditions may be set in dependence at least in part on surface gradient in combination with a value of surface coefficient of friction between a wheel of the vehicle and the surface and/or the detected off-highway condition.

For example, in one embodiment if an off-highway speed control system determines that the maximum speed may be increased from 2 kph to 10 kph whilst the vehicle is ascending a relatively steep gradient in a driving mode indicating the surface may have a relatively low coefficient of friction, the speed control system may reduce a value of a maximum allowable rate of acceleration of the vehicle from (say) 1.5 ms-2 to 125 ms-2. Other arrangements are also useful.

In a modification, a change of vehicle attitude may be sensed, and the maximum speed control speed varied accordingly. Thus upon reaching a crest, the maximum allowable speed control speed may automatically reduce so as to allow the vehicle driver time to see the forward path of the vehicle, which may be temporarily below the line of sight across the vehicle bonnet. Thus if a user was ascending the slope at a speed exceeding the reduced maximum allowable value, the vehicle speed is temporarily reduced to the new maximum allowable value.

Optionally, the method may comprise detecting that the vehicle attitude is sufficiently level following cresting, and increasing automatically the value of maximum speed control speed.

Further optionally, the method may comprise detecting when a rate of change of vehicle attitude has fallen below a prescribed value, following detection that the vehicle is cresting, and then increasing automatically the value of maximum speed control speed. This feature has the advantage that the maximum allowable speed control speed may be reduced whilst the vehicle is driving over a peak, allowing the vehicle to clear the peak and become established on a descent or travel over level ground following negotiation of the peak.

The method may comprise increasing the value of maximum speed control speed when the rate of change of attitude (as a function of time in some embodiments or as a function of distance in come embodiments) has fallen below the prescribed value, following a reduction due to detection of cresting.

In some embodiments, the method comprises detecting when a vehicle has reached the bottom of a slope by detecting an increase in vehicle pitch following a descent. The method may comprise reducing temporarily the value of maximum set speed when it is detected that the vehicle has reached the bottom of a slope in order to allow a driver time to negotiate the change in gradient. This feature has the advantage that it may reduce a risk of damage to a vehicle due to contact between an underside of the vehicle and terrain. Other arrangements are also useful.

The method may comprise controlling the vehicle automatically to increase its speed to or towards the user set speed if the value of user set speed is greater than the temporarily reduced value of maximum set speed. Alternatively the method may comprise awaiting an input from the driver confirming that such an increase is to be undertaken.

In one embodiment the level of friction at the vehicle tyre/terrain interface may be detected, so that maximum speed control speed is reduced if friction levels are reduced, as in ice and snow conditions. Low friction may be detected by conventional systems of measuring wheel slip or systems of measuring torque reaction at the vehicle wheels.

Maximum speed control speed may be reduced according to ambient conditions, for example detection of low temperature exterior to the vehicle, or detection of rain, snow and the like. Such reduction may be progressive, and indicated by for example an external temperature sensor or by operation of windscreen wipers.

In one embodiment the maximum speed control speed may be restricted according to a radius of curvature of travel, so that the tighter the radius, the more the maximum speed control speed is reduced. Radius of curvature may be indicated by for example a steering angle sensor, a vehicle accelerometer, or a combination of both. A lateral acceleration of for example 0.3 g may for example result in a restriction of maximum speed control speed.

In an embodiment, the method may comprise monitoring a radius of curvature of a path of the vehicle by reference to data in respect of geographical location of the vehicle and comparing the radius with that expected for the current steering angle. If the radius expected for the current steering angle is smaller, it may be inferred that the vehicle is suffering understeer. The method may comprise setting the maximum allowable speed whilst the vehicle is under the control of the speed control system in dependence on the amount of understeer, being the mismatch between radius of curvature of actual vehicle path and expected radius of curvature for the currently selected value of steering angle when understeer is occurring. The larger the mismatch, the lower the maximum allowable speed.

The maximum speed control speed may be sensitive to detection of standing water, in particular wading, so as to ensure progress of the vehicle at a rate appropriate to the depth of water sensed. Any suitable means of sensing depth is appropriate, including immersion sensors and radar type devices.

Any or all of the examples given above may be used independently or in combination according to conditions of use of the vehicle.

Furthermore, any or all of the examples given above may be selectable by the vehicle driver, or may be automatically enabled upon sensing of an operating condition by a vehicle system. In particular selection of a vehicle operating mode by the vehicle driver may automatically enable one or more systems for restricting maximum speed control speed.

In an embodiment of the invention, a reduction in maximum speed control speed may be temporary, to permit time for evaluation by the vehicle driver. Such temporary reduction may be indicated to the vehicle driver in any suitable manner, for example by message on the human machine Interface (HMI).

In an embodiment of the invention, a reduction in maximum speed control speed may be overridden by the vehicle driver.

An embodiment of the invention also provides a speed control module of a vehicle having inputs indicative of the conditions noted above, and a processor adapted to evaluate said inputs by reference to conditions contained in a memory of the module, or to an appropriate algorithm executed in the processor. Thus a plurality of successive limits may be applied, each limit being in response to a respective input, and the limits may progressively indicate a reduction in maximum speed control speed as the severity of the input increases. Such limits may be held in a suitable look-up table or the like.

According to a further aspect of the invention there is provided a vehicle having such a module, and a source of motive power such as an internal combustion engine or an electric motor.

In one aspect of the invention for which protection is sought there is provided a method of cruise control for a vehicle, said method comprising:
detecting an off-highway condition of the vehicle;
automatically setting a maximum cruise control speed appropriate to the detected off-highway condition; and
enabling selection of off-highway cruise control.

The method may comprise the step of permitting variation of vehicle cruise speed whilst cruise control is enabled in said off-highway condition.

The method may comprise the step of providing an override for said maximum speed.

The method may comprise the steps of selecting an off-highway condition of the vehicle and automatically setting said maximum speed.

The method may comprise the step of selecting a plurality of parameters to be detected dependent upon the selected off-highway condition.

Said off-highway condition may be selected automatically by a system of the vehicle.

The method may comprise the step of repeatedly setting a maximum cruise control speed in accordance with one or more detected conditions of the vehicle.

The method may be repeated at a frequency of greater than 10 Hz.

The method may comprise the step of setting said maximum cruise control speed at the minimum individually indicated by a plurality of said conditions.

A reduction in maximum cruise control speed may be temporary.

In a further aspect of the invention for which protection is sought there is provided an electronic control unit of a vehicle adapted to detect an off-highway condition of the vehicle and set a maximum cruise control speed appropriate to said condition.

Said maximum maybe automatically enabled upon detecting of an off-highway condition.

Said maximum may be dependent upon the selected off-highway condition.

In one aspect of the invention for which protection is sought there is provided a vehicle incorporating an electronic control unit according to the preceding aspect.

The vehicle may have a terrain sensor for automatically detecting one of a plurality of off-highway conditions.

In an aspect of the invention for which protection is sought there is provided a vehicle adapted to sense a condition of use in which a maximum speed control speed is reduced. The condition of use may be indicated by a sensor of the vehicle, or selected according to the kind of terrain across which the vehicle is travelling. Selection of terrain type may be manual or automatic, and may enable a selection of sensors appropriate to the terrain type. A vehicle driver may select a speed control speed lower than the permitted maximum Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features disclosed in connection with one embodiment are applicable to all embodiments, unless such features are incompatible.

BRIEF DESCRIPTION OF DRAWINGS

The present invention will now be described, by way of example only, with reference to the accompanying drawings, in which.

DETAILED DESCRIPTION

Figure 1:
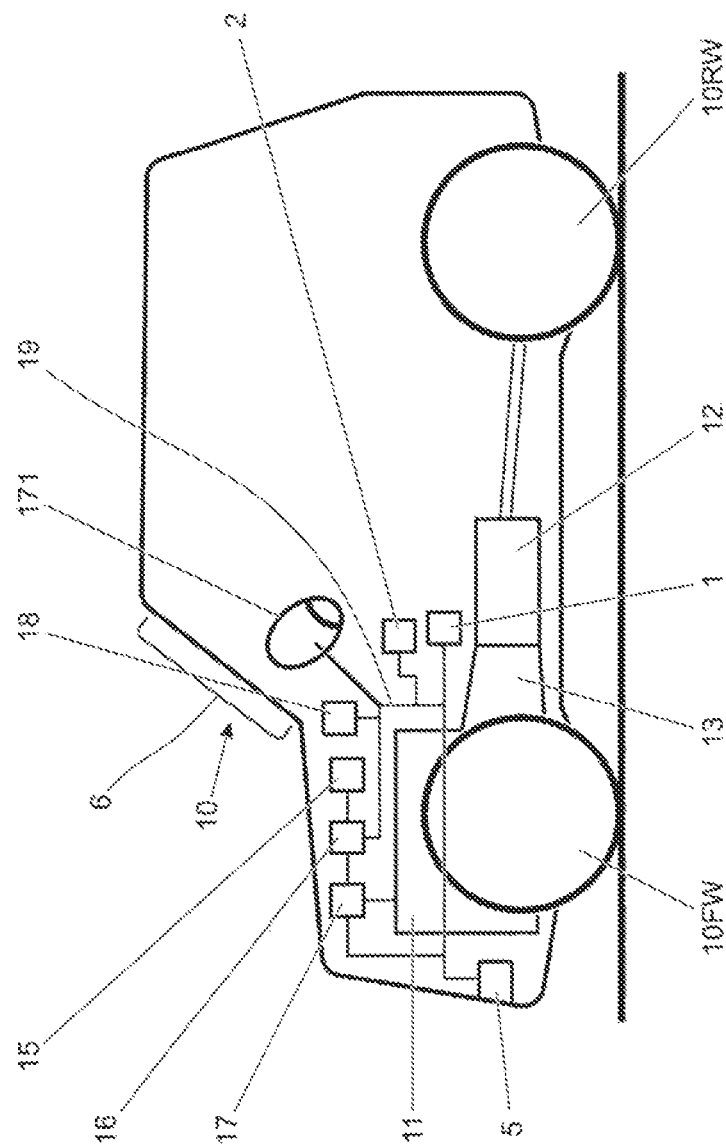
FIG. 1 is a schematic illustration of a vehicle according to an embodiment of the present invention.

FIG. 1 is a schematic illustration of a vehicle 10 according to an embodiment of the present invention. The vehicle 10 has a prime mover or motor 11 in the form of an internal combustion engine. The engine 11 is coupled to a transmission 12 by means of a coupling 13. The coupling 13 is arranged to allow the transmission 12 progressively to reach a speed compatible with motor speed when the vehicle 10 is accelerated from rest. The coupling 13 is typically a friction clutch, torque converter or the like. The transmission 12 is arranged to drive a pair of rear wheels 10RW and optionally a pair of steerable front wheels 10FW in addition. An accelerator pedal 1 allows a driver to control an amount of torque developed by the motor 11 under the control of a powertrain controller 17 whilst a brake pedal 2 allows a driver to apply a braking system under the control of a brake controller 16.

A driving mode selector 19 is provided by means of which a driver may select an on-road driving mode or one of a plurality of off-road driving modes which include a grass/gravel/snow (GGS) driving mode, sand (S) driving mode and a mud and ruts (MR) driving mode. In some embodiments the selector also allows an 'automatic response mode' to be selected in which the vehicle 10 determines automatically the optimum driving mode at any given moment in time.

Figure 2:
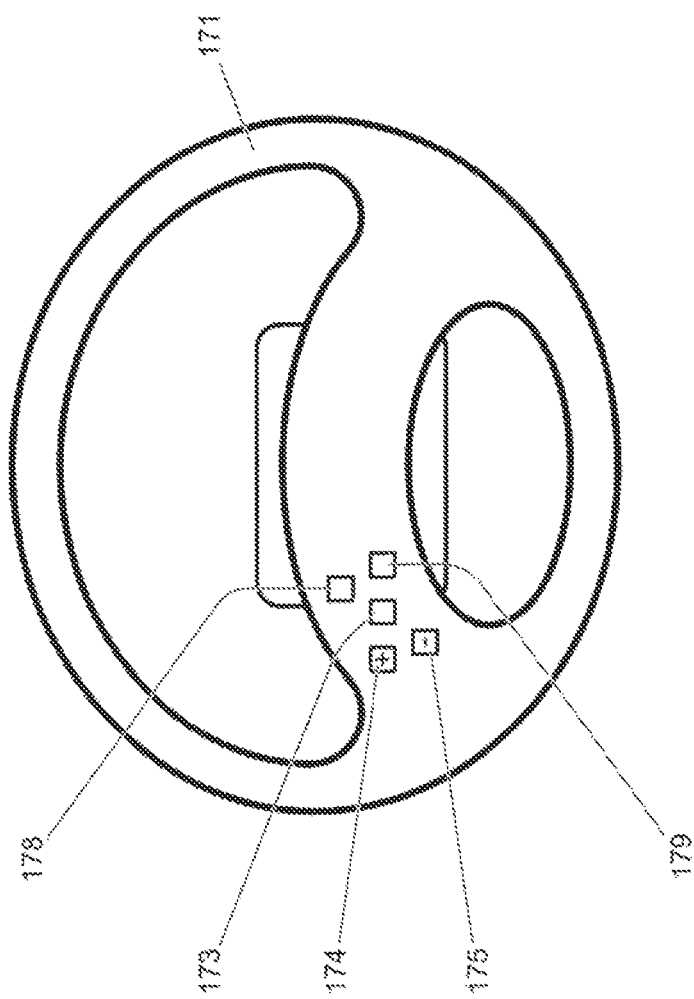
FIG. 2 is a schematic illustration of a steering wheel of a vehicle according to an embodiment of the present invention.

The vehicle 10 has a vehicle control unit (VCU) 15 that is operable to implement a vehicle speed control function. The VCU 15 may be described as implementing a speed control system. The speed control function is controlled by a user by means of input controls mounted to a steering wheel 171 of the vehicle 10. The steering wheel 171 is shown in more detail in FIG. 2.

The input controls include a 'set-speed' control 173, actuation of which sets the value of a parameter driver_set_speed to be substantially equal to the current vehicle speed. Depression of a '+' button 174 allows the set-speed to be increased whilst depression of a '−' button 175 allows the set-speed to be decreased. In some embodiments, if the speed control function is not active when the '+' button 174 is depressed, the speed control function is activated.

The wheel 171 also has a pair of following distance control buttons 178, 179 for setting a value of a parameter distance_following, being the distance the driver desires the vehicle 100 to maintain behind a lead vehicle. Similar the VCU 15 is operable to control the vehicle 10 to maintain a distance behind a lead vehicle that is substantially equal to distance_following. A first of the buttons 178 is operable to increase the value of the parameter distance_following whilst a second of the buttons 179 is operable to decrease the value of the parameter distance_following.

The vehicle 10 has a radar module 5 mounted to a front thereof and arranged to project a radar beam in a direction ahead of the vehicle 10. The module 5 is arranged to defect radiation reflected by a lead vehicle and to determine a distance of the lead vehicle from vehicle 10 (being a 'host' vehicle). The module 5 is provided with a signal indicative eta current speed of the host vehicle 10. From this signal and data in respect of a variation in distance of the lead vehicle from the host vehicle 10 as a function of time, the module 5 is able to calculate a speed of the lead vehicle. Other arrangements for determining distance from the lead vehicle and speed of the lead vehicle are also useful.

When the speed control function is activated, the VCU 15 controls the speed of the vehicle 10 to be substantially equal to a driver set-speed driver_set_speed. The driver may set the value of driver_set_speed by depressing the 'set-speed' control 173 whilst the vehicle 10 is travelling. When the VCU 15 detects that the 'set-speed' control 173 has been pressed, the VCU 15 takes a snapshot of the current speed of the vehicle 10 and sets the value of driver_set_speed lo correspond to the current speed.

When the vehicle 10 is travelling along a road at a speed exceeding a minimum allowable set-speed set_speed_min, the VCU 15 is operable to allow the user to command the VCU 15 to maintain the current vehicle speed by depressing set-speed control 173. In the absence of traffic ahead of the vehicle 10, the VCU 15 controls the speed of the vehicle 10 to maintain the set-speed.

If the VCU 15 detects (by means of radar module 5) the presence of a lead vehicle ahead of the vehicle 10, the VCU 15 is operable to reduce the speed of the host vehicle 10 according to the speed of the lead vehicle in order to maintain a distance behind the lead vehicle that is no less than a prescribed distance. The prescribed distance may be set by a driver by means of 'following distance' control buttons 178, 179.

The vehicle 10 has a human machine interface (HMI) in the form of a touchscreen 18 by means of which the VCU 15 may communicate with a user.

The VCU 15 is operable to calculate a maximum allowable value of set-speed in dependence on the terrain over which the vehicle is travelling. Thus, the VCU 15 is operable to limit the maximum speed at which it will control a vehicle 10 to operate in dependence en the terrain. Embodiments of the invention allow improved vehicle composure when operating in off-highway conditions with reduced driver intervention. That is, because the VCU 15 determines the maximum allowable value max_set_speed of the set-speed and limits the set-speed accordingly, a driver is not repaired to intervene in order to reduce the value of vehicle set-speed when the prevailing terrain so warrants, and to increase the set-speed when the prevailing terrain allows, in the present embodiment the VCU 15 is only operable to calculate a value of max_set_speed if an off-road condition of the vehicle to has been selected. That is, if a driver has selected a terrain response driving mode corresponding to off-road conditions or the vehicle 10 has selected automatically such a driving mode.

Figure 3:
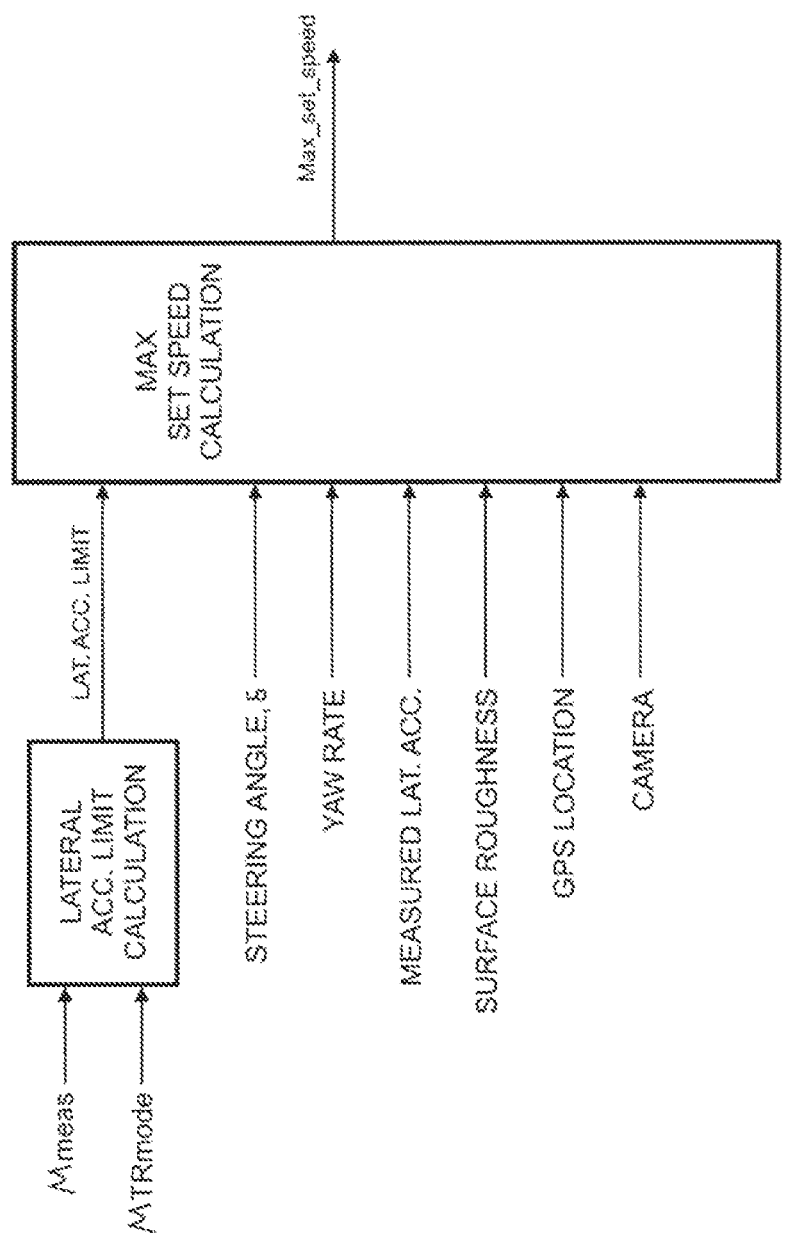
FIG. 3 is a schematic illustration of function for determining a maximum allowable value of speed control speed in dependence on the value of a plurality of vehicle parameters.

FIG. 3 illustrates a manner in which the VCU 15 determines a value of max_set_speed. The VCU 15 is configured to receive inputs corresponding to a number of vehicle parameters. The parameters are: (a) a current vehicle reference value of surface coefficient of friction, being a value calculated by the VCU 15 based on values of one or more parameters such as an amount of torque applied to a wheel at which excessive wheel slip was induced; (b) a value of expected surface coefficient of friction corresponding to a currently selected vehicle driving mode, being a prescribed value for each driving mode; (c) a current value of steering angle, corresponding to a steerable road wheel angle or steering wheel position; (d) a current yaw rate of the vehicle (determined by reference to an output of an accelerometer); (e) a current measured value of lateral acceleration (also determined by reference to an output of an accelerometer); (f) a current measured value of surface roughness (determined by reference to suspension articulation); (g) a current location of the vehicle (determined by reference to a global satellite positioning system (GPS) output); and (h) information obtained by means of a camera system. The information obtained by means of a camera system may include for example an alert in the event that it is determined that the vehicle 10 may be about to depart from an off-road lane or track.

The VCU 15 is configured to determine, from the reference and expected values of surface coefficient of friction, a maximum allowable rate of lateral acceleration max_lat_acc of the vehicle 10 during the course of a journey. The VCU 15 employs this value of max_lat_acc to limit the value of max_set_speed when the vehicle is cornering, so as to prevent understeer.

In the present embodiment the VCU 15 is also operable to calculate a radius of curvature of a path of the vehicle 100 over terrain based on steering angle. The VCU 15 compares this radius of curvature with a value determined by reference to a path of travel of the vehicle determined by reference to GPS location data. If the VCU 15 detects the presence of understeer the VCU 15 is operable to reduce the value of max_set_speed accordingly. Yaw rate and measured lateral acceleration are also employed in the present embodiment in order to increase a reliability of the determination of the amount of understeer present, if any. In some embodiments, yaw rate and measured lateral acceleration are not employed in determining the amount of understeer present. Other arrangements are also useful.

The VCU 15 also determines the value of max_set_speed according to a value of surface roughness of the terrain over which the vehicle 10 is driving. The value of max_set_speed is reduced as the surface roughness increases.

Figure 4:
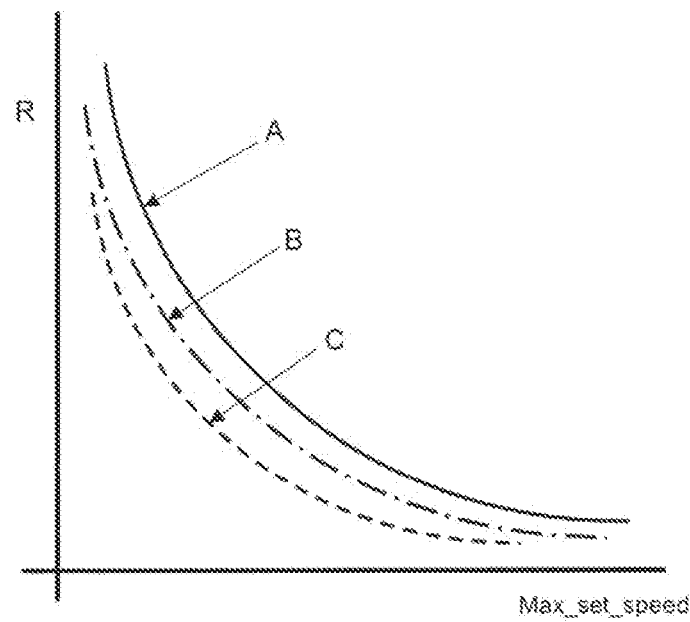
FIG. 4 shows maximum allowable speed control speed as a function of terrain roughness, for different gradients.

FIG. 4 illustrates a form of the variation of max_set_speed with surface or terrain roughness. Trace A corresponds to a vehicle travelling over substantially level (non-inclined) terrain. In general, the greater the roughness sensed by the vehicle 10, the lower the maximum cruise control speed max_set_speed. Thus in very smooth conditions, the maximum speed may not be limited, or may be limited by another vehicle system. In very rough conditions vehicle speed may be reduced to 5 kph or lower.

In some embodiments of the present invention the vehicle driver may reduce speed still further by the use of incremental speed adjustment buttons 174, 175 as described above. In some embodiments the VCU 15 is operable to override the value of max_set_speed upon receipt of a command to do so from the driver.

In the present embodiment the characteristic of trace A of FIG. 4 is retained in a memory of the VCU 15 (or other electronic control module for cruise control) and is periodically compared with the surface roughness input signal. The surface roughness input signal may be determined by reference to indicators of suspension travel and frequency of movement thereof. The value ascribed to the characteristic of FIG. 4 can be determined empirically by a suitably skilled person having regard to the vehicle to which a system according to an embodiment of the invention is to be applied. Accordingly it can be envisaged that a vehicle adapted to off-road use may be able to maintain a generally higher maximum cruise control speed in such conditions than a vehicle not so adapted.

The characteristic of FIG. 4 may be modified according to other factors of vehicle use. For example speed may be further reduced in the event of detection of a gradient so that the characteristic of trace B applies in the event of an uphill gradient being detected. According to trace B, the value of max_set_speed is lower than that of trace A for a given value of surface roughness. The characteristic of trace C may apply in the event of a downhill gradient being detected. According to trace C, the value of max_set_speed is lower than that of trace B for a given value of surface roughness. Other arrangements are also useful.

FIG. 4 illustrates a relatively simple case in which a threshold gradient imposes a restricted characteristic. However it will be appreciated that a progressive change of characteristic can be implemented so that one of a plurality of characteristics applies according to the severity of the gradient.

In use the VCU 15 reviews the input signals at a refresh rate of 10 Hz or greater, and varies the maximum permissible set-speed max_set_speed in consequence. However the vehicle 10 continues to progress at the instant cruise control speed driver_set_speed unless the vehicle driver seeks an incremental advance (above the value of max_set_speed) or the value of max_set_speed is exceeded. The value of max_set_speed may be exceeded, for example, as a result of a change of terrain or as a result of a change in gradient. A limitation of vehicle speed according to an embodiment of the present invention may be flagged to the driver.

If the vehicle 10 is travelling over terrain and the value of driver_set_speed is below max_set_speed, the vehicle 10 continues to travel at the speed driver_set_speed. The driver is able to increase or decrease the value of driver_set_speed in the manner described above. However, once the value of driver_set_speed is equal to max_set_speed, the VCU 15 does not allow vehicle speed to increase further. If the value of max_set_speed falls below driver_set_speed, for example due to a change in terrain, the VCU 15 controls vehicle speed to reduce to max_set_speed so that max_set_speed is no longer exceeded. The value of max_set_speed therefore sets a ceiling on the vehicle speed at any given moment in time whilst vehicle speed control is being effected by the VCU 15.

If the value of max_set_speed subsequently rises, the VCU 15 allows vehicle speed to increase to or towards driver_set_speed (where driver_set_speed is greater than max_set_speed) provided the speed does not exceed max_set_speed.

Thus, the VCU 15 automatically reduces cruise control speed if operating conditions indicate a speed reduction is appropriate. However an increase in cruise control speed is at the request of the driver, and dependent upon the control module allowing a higher speed.

Should a higher speed become allowed, a suitable visual or audible indication may be made to the vehicle driver. In one embodiment, should a higher speed become allowed, the speed of the vehicle will automatically be increased to the higher speed.

Figure 5:
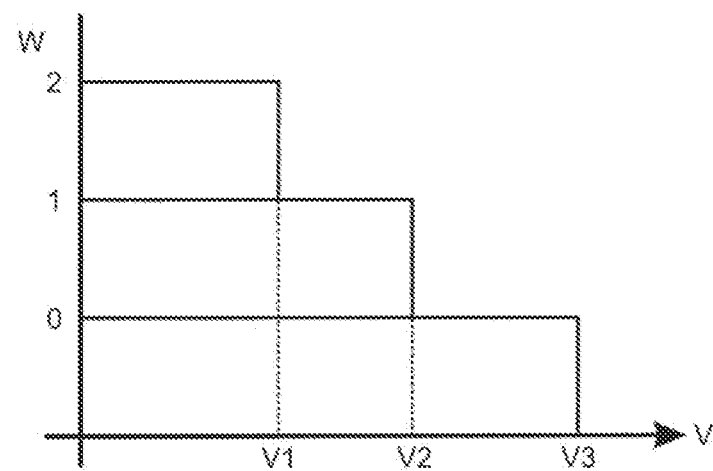
FIG. 5 illustrates a condition indicator of reduced maximum allowable speed control speed.

FIG. 5 illustrates how an operating state of windscreen wipers 6 may influence maximum cruise control speed if an off-road condition (such as an off-road driving mode) is selected. The operating state of the wipers 6 is given by a value of parameter W. When W=0, the wipers 6 are switched off; when W=1, the wipers 6 operate at a relatively slow speed. When W=2, the wipers 6 operate at a relatively fast speed. It is to be understood that the state of the wipers may provide a useful indication that terrain over which a vehicle is operating may be wet (and therefore more slippery) and/or that driver visibility is reduced, warranting the selection of a lower value of max_set_speed. Operation of the wipers 6 at the relatively fast speed may usefully indicate that the surface is particularly wet (and therefore particularly slippery) and/or that driver visibility is reduced mere severely, warranting a further reduction in max_set_speed.

It can be seen from FIG. 5 that a relatively high value v3 of max_set_speed is enabled if the wipers are off (W=0), a lower speed V2 if the wipers are at the relatively slow speed (W=1), and a still lower speed v1 if the wipers are at the relatively high speed (W=2).

Where several parameters are tested to determine maximum cruise control speed max_set_speed, a suitable decision matrix may be applied in the VCU 15 or control module. Typically the outcome may be that the lowest maximum cruise control speed is applied to the vehicle if several maximums are indicated by different parameters, or the decision matrix may generate a maximum dependent upon the aggregation of maxima. Other arrangements are also useful.

In one embodiment, the VCU 15 is operable to detect when a vehicle 10 has reached the top of a slope and is beginning to assume a level attitude. This scenario may be referred to as 'cresting'. When the VCU 15 determines that the vehicle 10 is cresting, it may temporarily reduce the value of max_set_speed. This feature has the advantage that it reduces (if necessary) the vehicle speed to a speed that allows time for a driver to gain familiarity with terrain ahead of the vehicle 10 which may have been obscured by the slope and/or a front portion of the vehicle 10. This enhances driver enjoyment of the vehicle 10 and vehicle composure.

When the VCU 15 detects that the vehicle attitude is sufficiently level, it may increase automatically the value of max_set_speed. The VCU 15 may control the vehicle 10 automatically to increase its speed to or towards driver_set_speed if the value of driver_set_speed is greater than the temporarily reduced value of max_set_speed. Alternatively the VCU 15 may await an input from the driver confirming that such an increase is to be undertaken.

In an embodiment, the VCU 15 is operable to detect when a rate of change of vehicle attitude has fallen below a prescribed value, following detection that the vehicle 100 is cresting. The VCU 15 then begins to increase the value of max_set_speed. This feature is advantageous where a vehicle is traversing undulating terrain where, following cresting of a peak, the vehicle descends a slope. The VCU 15 maintains a reduced value of max_set_speed until the vehicle 100 is established on a descent of the slope.

In some embodiments, the VCU 15 is configured to detect when a vehicle has reached the bottom of a slope by detecting an increase in vehicle pitch following a descent. The VCU 15 may be configured to reduce temporarily the value of max_set_speed when it is detected that the vehicle has reached the bottom of a slope in order to allow a driver time to negotiate the change in gradient. This feature has the advantage that it may reduce a risk of damage to a vehicle due to contact between an underside of the vehicle and terrain. Other arrangements are also useful.

Embodiments of the present invention are useful in enhancing vehicle composure by reducing automatically a maximum allowable value of set-speed when a vehicle is operating with a speed control system operational. Driver workload is reduced accordingly, reducing driver fatigue. Vehicle composure is also enhanced.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of using an electronic control unit to automatically control the speed of a vehicle, said method comprising:
   detecting at least one off-road condition of the vehicle; and
   the electronic control unit automatically setting a maximum speed control speed appropriate to the detected off-road condition, wherein
   detecting at least one off-road condition of the vehicle comprises at least one of the electronic control unit detecting a user selected off-road terrain type, or an automatic sensing of an off-road terrain type, wherein the maximum speed control speed can differ depending on the off-road terrain type.

2. A method according to claim 1 comprising the electronic control unit enabling selection of off-road speed control.

3. A method according to claim 1 comprising the electronic control unit enabling selection of off-road speed control when an off-road condition has been detected.

4. A method according to claim 1, including automatically controlling vehicle speed to match a set-speed, the method comprising permitting variation of vehicle set-speed whilst speed control is enabled in said off-road condition.

5. A method according to claim 1, comprising providing an override for said maximum speed.

6. A method according to claim 1, comprising determining said maximum speed by selecting a plurality of parameters to be automatically detected, an identity of the selected parameters being dependent upon said off-road terrain type, and determining the maximum set-speed according to a value of the plurality of parameters.

7. A method according to claim 1, comprising repeatedly setting a maximum speed control speed in accordance with one or more detected conditions of the vehicle.

8. A method according to claim 7, and repeated at a frequency of greater than 10 Hz.

9. A method of using an electronic control unit to automatically control the speed of a vehicle, said method comprising:
   detecting at least one off-road condition of the vehicle;
   the electronic control unit automatically setting a maximum speed control speed appropriate to the detected off-road condition, wherein
   detecting at least one off-road condition of the vehicle comprises at least one of the electronic control unit detecting a user selected off-road terrain type, or an automatic sensing of an off-road terrain type;
   repeatedly setting a maximum speed control speed in accordance with one or more detected conditions of the vehicle; and
   setting said maximum speed control speed at the minimum individually indicated by a plurality of said detected off-road conditions.

10. A method according to claim 1, comprising setting the maximum speed control speed in dependence on whether a vehicle is cresting a slope.

11. A method according to claim 1, wherein a reduction in maximum speed control speed is temporary.

12. An electronic control unit for automatically controlling the speed of a vehicle, the electronic control unit configured to automatically detect at least one off-road condition of the vehicle and set a maximum speed control speed appropriate to said condition, wherein
   detecting at least one off-road condition of the vehicle comprises at least one of the electronic control unit detecting a user selected off-road terrain type, or an automatic sensing of an off-road terrain type, wherein the maximum speed control speed can differ depending on the off-road terrain type.

13. A control unit according to claim 12 operable to enable selection of off-road speed control.

14. A control unit according to claim 12 operable to enable selection of off-road speed control when an off-road condition has been detected.

15. A control unit according to claim 12, wherein said maximum speed control speed is automatically enabled upon detecting of an off-road condition.

16. A vehicle incorporating the electronic control unit of claim 12.

17. A vehicle according to claim 16, and having a terrain sensor for automatically detecting one of a plurality of off-road conditions.

* * * * *